March 2, 1948.   E. K. KAPRELIAN   2,437,032
VARIABLE FIELD RANGE AND VIEW FINDER
Filed Aug. 9, 1945   2 Sheets-Sheet 2

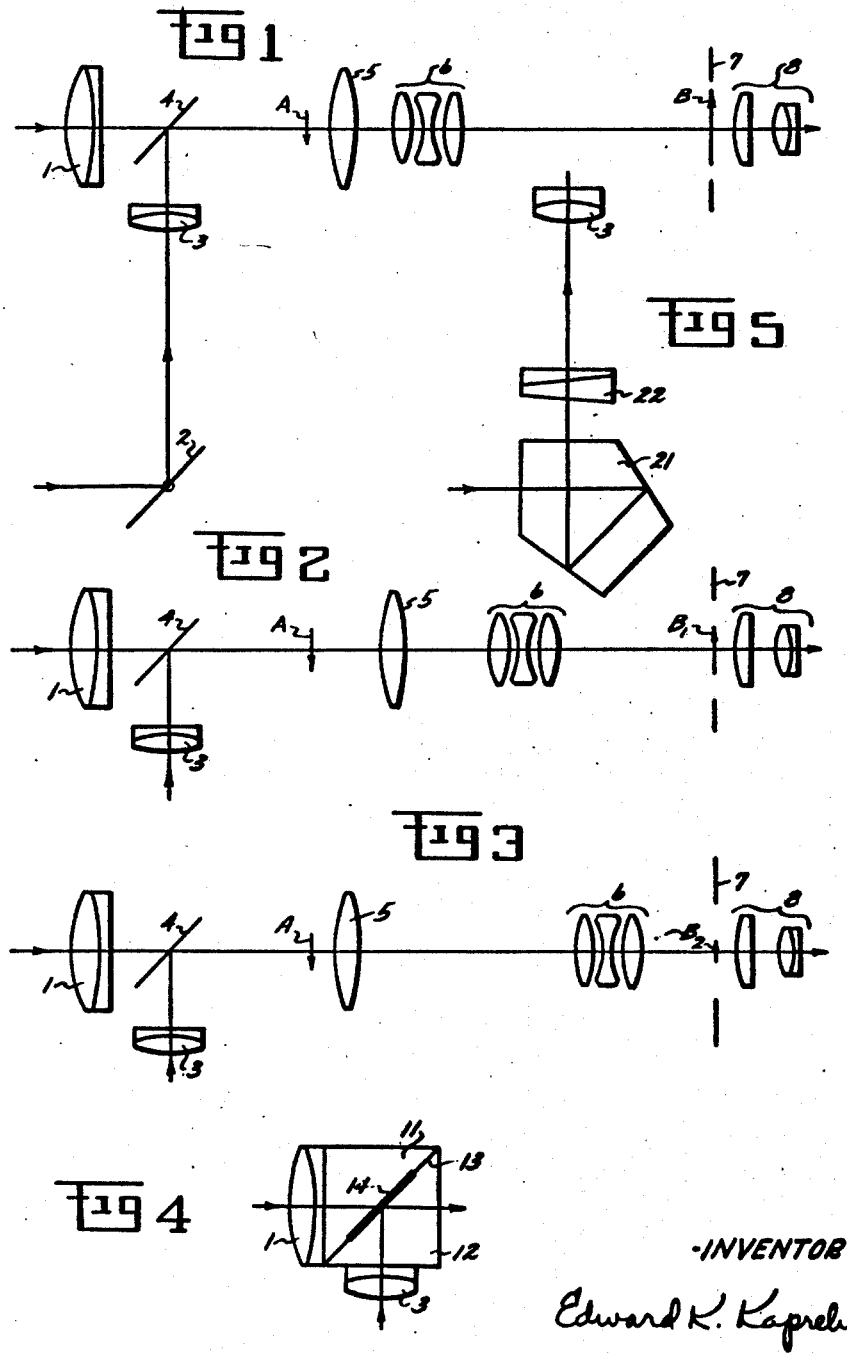

-INVENTOR-
Edward K. Kaprelian

Patented Mar. 2, 1948

2,437,032

UNITED STATES PATENT OFFICE 2,437,032

VARIABLE FIELD RANGE AND VIEW FINDER

Edward K. Kaprelian, Alexandria, Va.

Application August 9, 1945, Serial No. 609,840

4 Claims. (Cl. 88—2.4)

This invention relates to combined view and range finders for photographic cameras and is particularly directed to an arrangement whereby the rangefinder and viewfinder images may be varied in angular size to compensate for the different fields of view afforded by lenses of different focal length.

In previous combined view and range finders no provision has been made for altering the field of view of the viewfinder portion other than by masking down the viewfinder aperture to compensate for the smaller field of view of a telephoto lens. This has resulted in exceptionally small viewfinder images making it difficult to find and accurately center the object. Furthermore, it has been impossible in previous systems to provide means for increasing the field of view of a combined view and range finder to correspond to the field of view of a wide angle lens. As a result, auxiliary view finders are employed for lenses of different focal lengths, thus forfeiting the advantages of a combined view and range finder.

One object of this invention is to provide a combined view and range finder in which the field of view may be varied within a range corresponding to that covered by a series of interchangeable lenses.

Another object of the invention is to provide a variable field combined view and range finder in which the magnifications of the viewfinder and rangefinder images are maintained equal.

A still further object is to provide such a variable field view and range finder which may readily be adapted for coupled operation with the lens focusing means of the camera.

Other objects and advantages will be apparent in the specification and in the accompanying drawings in which:

Fig. 1 shows one modification of the combined view and range finder in which the parts are in the position of greatest angular field of view.

Fig. 2 shows the modification of Fig. 1 with the parts in a position of medium angular field of view.

Fig. 3 shows the modification of Fig. 1 with the parts in the position of least angular field of view.

Fig. 4 shows a modified arrangement for mounting the objective lenses of the system of Figs. 1 to 3.

Fig. 5 shows a modification of the combined view and range finder in which the parts are in the position of greatest angular field of view.

Figure 7:
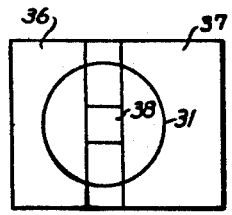
Fig. 7 is a view of the arrangement of Fig. 5 across section 6—6.

In the modification of Figs. 1 to 3 inclusive, the basic optical system is a variable power telescope with a range of powers from about 0.3 or 0.5 to about 4 or 6 to provide a ratio of powers of from about 8 to 1 to about 12 to 1. With modifications in the powers and a reduction in the apparent angular view in the eyepiece this ratio may be extended somewhat.

The optical system includes an objective 1 which forms at A an inverted, reduced image of the field of view. Lens 5 together with objective lens 6, the latter preferably in the form of a symmetrical anastigmatic photographic objective such as a triplet, act to reimage A in the form of a real, erect image B in the plane of a mask or diaphragm 7 which has dimensions proportional to the frame size of the photographic negative. Mask 7 is preferably removable for replacement by masks of different proportions to correspond to the dimensions of different negative areas. The real, erect image is observed through a wide angle ocular such as the Kellner eyepiece shown at 8.

Movable mirror 2 receives light from the object and cooperates with lens 1 to form the base of the rangefinder. Light from the object is reflected by mirror 2 through objective 3 to beam splitter 4 which may be a semi-reflecting mirror or the like. Objective 3 has the same focal length as objective 1 and its image, due to the action of beam splitter 4, falls at A in coincidence with the image from objective 1 when mirror 2 is properly positioned. Objective 3 may have the same aperture as objective 1 if desired; if objective 3 is smaller, as shown, the transmission-reflection factor of mirror 4 may be chosen to yield optimum relative brightnesses of the two images at A. Objectives 1 and 3 must be capable of satisfactorily imaging the required angle of view.

In the position of the elements as shown in Fig. 1 the system yields its highest magnification or its smallest angular field of view corresponding to the field of view resulting with long focal length lenses. In this position images A and B are at the conjugate foci of combined lenses 5 and 6.

Fig. 2 shows the arrangement of movable elements 5 and 6 in the position yielding medium magnification of the order of 1 or 2 power and corresponding to the medium field of view resulting with the use of medium focal length lenses. The entire optical system, exclusive of the mirror, is fixed except for lenses 5 and 6. To decrease the original magnification lens 6 is moved back to the position shown. This results in the formation of a less magnified image at the eyepiece, again at a point which corresponds to the second conjugate focus of the combination of lenses 5 and 6. Inasmuch as this new image would fall a considerable distance in front of mask 7 lens 5 is moved to a new position as shown to contribute differently to the refracting power of lens 6 to reimage A at B₁ in the plane of mask 7. Thus, while lens 6 may be considered the lens which contributes magnification to the system, lens 5 is a compensating lens which shifts the final, erect image to the proper plane.

In Fig. 3 the system has its smallest angular magnification and its largest angular field of view, corresponding to the field of view covered with wide angle lenses. In this position lens 6 is nearest the erect image B₂ and lens 5 has returned to a position which permits the conjugate foci of the combination to again remain as previously, i. e., at A and in the plane of mask 7. Lenses 5 and 6 may be moved in any suitable manner, slotted, rotatable sleeves acting as cams being one relatively simple and well known means.

The lenses are moved in such manner that the image as seen through eyepiece 8 is constantly in focus and in the plane of the mask throughout the entire range of varying fields of view. Superposed on the image of the total field of view is the rangefinder image which may be shifted to coincidence by operation of a focusing device which rotates mirror 2 through a small angle in any usual and well known manner. The rangefinder may be coupled to the camera lens if desired, there being many arrangements in the prior art which can be adapted for use with the present invention.

Lenses 1 and 3 may be mounted as shown in Fig. 4 to provide great rigidity and stability instead of in the fashion shown in Figs. 1 to 3. In Fig. 4 lenses 1 and 3 are cemented or otherwise attached to a pair of 45° prisms 11 and 12, each of which have one common side 13 in contact as shown. A portion of one face 13 is provided with a semi-reflecting or ray dividing surface 14. Preferably the prisms are cemented together at their common face to avoid unnecessary loss of light by reflection. In this modification, as well as in that of Figs. 1 to 3, lenses 1 and 3 may be of the same size and, where conditions of use are such that a large area of rangefinder image coincidence is desirable, the ray dividing surface may extend the entire width and height of the field of view, i. e., the rangefinder image may extend completely across the viewfinder image.

Figure 6:
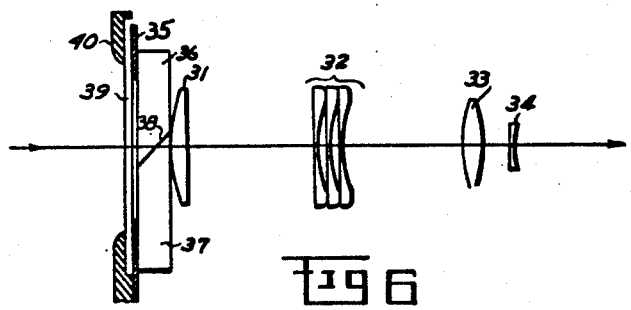
Fig. 6 shows the modification of Fig. 5 with the parts in the position of least angular field of view.

The modification shown in Figs. 5 to 7 is based on the variable field viewfinder disclosed in my prior Patent No. 2,353,565 and known as the Magnafield finder. This type of finder is capable of providing linear changes of field of view of the order of 20 to 1 and comprises four lenses or groups of lenses 31, 32, 33 and 34. Lenses 31 and 34 are fixed and lenses 32 and 33 are axially movable but have a constant mutual separation. Lenses 31 and 32 together act as the negative field lens of an inverted Galilean system and lenses 33 and 34 together act as the positive eyepiece of the system. In the relative position of the elements as shown in Fig. 5 the system has its lowest magnification and largest field of view. As lenses 32 and 33 move away from lens 31 the field diminishes and the magnification increases, until, in the limiting position of Fig. 6 the system has its greatest magnification and its minimum field of view. The system is not further described herein, full details of its construction and operation being disclosed in the prior patent referred to above.

In Fig. 5 light from the object passes through plates 36 and 37 and through a ray dividing surface 38 to lenses 31, 32, 33 and 34 of the viewfinder system to provide an image of the field of view. Light from the object is also received by mirror 41, and reflected to surface 38, the latter, together with mirror 41 forming the rangefinder base. The light in reaching surface 38 enters glass plate 37 perpendicular to its lower plane surface. This beam is directed into the viewfinder system by ray dividing surface 38 formed at the 45° face of either plate 36 or 37, the latter preferably being cemented to avoid unnecessary light loss by reflection. The proportions of the field of view are determined by the dimensions of mask 35. A sheet 39 of glass is held in protecting relation to plates 36 and 37 by flanged portion 40 of the camera case. Fig. 7 shows the arrangement of the plates, the ray dividing surface and lens 31 as seen along section 6—6 of Fig. 5.

In use the modification of Figs. 5 to 7 produces results similar to those obtained in the system of Figs. 1 to 3, the main difference being that the former utilizes virtual images while the images in the latter are real.

It will therefore be appreciated that the present invention provides a combined viewfinder and rangefinder in which both view and range finder images may be observed simultaneously through a single ocular, while permitting a change in the magnification of the entire optical system involved whereby the magnification of the images, and necessarily the field of view of the system, are varied over a wide range to correspond to the fields of view of lenses of widely different focal lengths.

Many modifications and changes are possible, the exact arrangement and character of the elements being given by way of example and limited only by the scope of the appended claims.

I claim:

1. In a combined viewfinder and rangefinder system for photographic cameras, lens means for forming an image of the viewfinder field of view at a given magnification in a given plane, lens means for forming an image of a rangefinder field of view at the same magnification in the same plane, the area of said viewfinder field of view being less than that of the rangefinder field of view, means for obtaining registry between the rangefinder field of view and the corresponding portion of the viewfinder field of view, a single ocular for viewing said images simultaneously, said ocular and lens means producing an image at a fixed distance in space, and means for altering the magnification of the system from approximately 0.3 to 6 times to thereby vary to a considerable extent the size of the viewfinder field of view and the rangefinder field of view while maintaining the same image distance in space, said means comprising two or more axially displaceable lens elements between the ocular and the plane of the view finder and range finder images.

2. A combined viewfinder and rangefinder system comprising a first lens means for forming an image of a viewfinder field of view at a given magnification, light receiving means spaced from said first lens means for forming a rangefinder entrance window, a second lens means receiving light from said light receiving means for forming an image of a rangefinder field of view at the same magnification, a light divider for combining the images formed by said first and second lens means, an ocular, and movable lens means between said images and said ocular for reimaging said images in the object plane of the ocular, whereby movement of said movable lens means varies the magnification of the system to alter the field of view while maintaining the images substantially in the object plane of the ocular.

3. A combined viewfinder and rangefinder system comprising a first lens means for forming an image of a viewfinder field of view, at a given magnification, light receiving means spaced from said first lens means for forming a rangefinder entrance window, a second lens means receiving light from said light receiving means for forming an image of a viewfinder field of view at the same magnification, a light divider for combining the images formed by said first and second lens means, an ocular, and movable lens means between said images and said ocular for reimaging said images at a given magnification in the object plane of the ocular, said movable lens means comprising a first movable lens for altering the magnification of the system and a second movable lens for maintaining such reimagery in the object plane of the ocular, to alter the field of view.

4. In a combined viewfinder and rangefinder system a viewfinder and rangefinder entrance window, a rangefinder entrance window, a cemented prism type of light dividing element for combining light received through said windows, said element having a beam splitting surface at the interfaces of the prisms, lens means receiving light from said element for forming at the same given magnification and in the same image plane a viewfinder and rangefinder image and a superposed rangefinder image, said lens means including outer fixed elements and inner movable lens elements whereby movement of the inner elements alters the distribution of power to change the magnification of the system from about 0.3 to 6 times to thereby vary considerably the size of the viewfinder field of view and the rangefinder field of view while maintaining imagery substantially in the aforesaid plane.

EDWARD K. KAPRELIAN.

REFERENCES CITED

The following references are of record in the file of this patent:

UNITED STATES PATENTS

| Number | Name | Date |
|---|---|---|
| 563,196 | Marchand | June 30, 1896 |
| 978,368 | Grub | Dec. 13, 1910 |
| 1,294,341 | Jolly | Feb. 11, 1919 |
| 1,992,534 | Leitz | Feb. 26, 1935 |
| 2,014,137 | Klar | Sept. 10, 1935 |
| 2,113,407 | Leitz et al. | Apr. 5, 1938 |
| 2,115,626 | French | Apr. 26, 1938 |
| 2,127,925 | Leitz | Aug. 23, 1938 |
| 2,155,389 | Arden | Apr. 25, 1939 |
| 2,202,593 | Moreau et al. | May 28, 1940 |
| 2,353,565 | Kaprelian | July 11, 1944 |
| 2,401,707 | Mihalyi et al. | June 4, 1946 |

FOREIGN PATENTS

| Number | Country | Date |
|---|---|---|
| 536,706 | Great Britain | May 23, 1941 |

Certificate of Correction

Patent No. 2,437,032. March 2, 1948.

EDWARD K. KAPRELIAN

It is hereby certified that error appears in the above numbered patent requiring correction as follows: In the drawings, Sheet 1, Fig. 5 should appear as shown below instead of as in the patent—

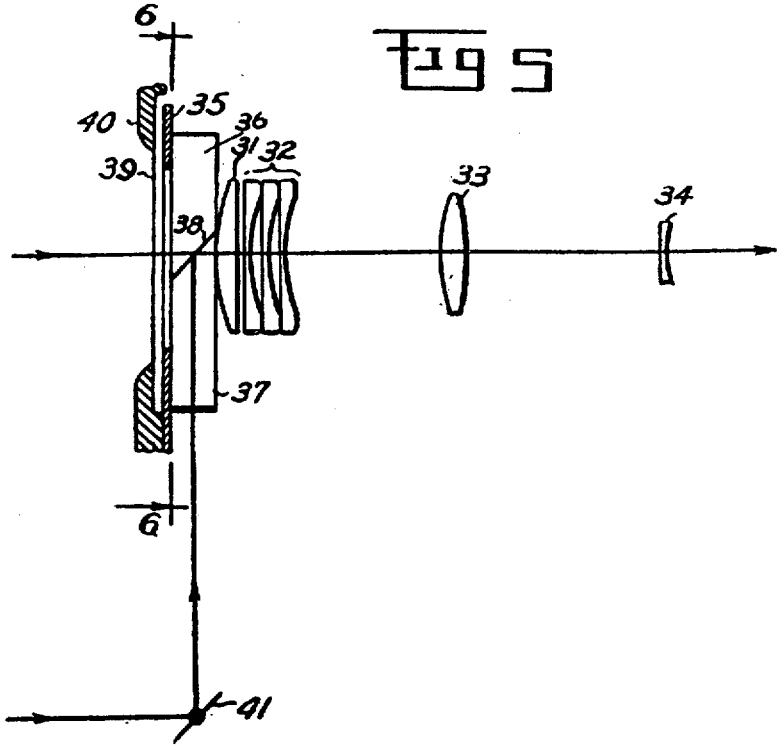

and that the said Letters Patent should be read with this correction therein that the same may conform to the record of the case in the Patent Office.

Signed and sealed this 11th day of May, A. D. 1948.

[SEAL]

THOMAS F. MURPHY,
*Assistant Commissioner of Patents.*